United States Patent [19]
Aoyama et al.

[11] Patent Number: 5,796,865
[45] Date of Patent: Aug. 18, 1998

[54] GRADATION CORRECTING METHOD AND APPARATUS

[75] Inventors: Tatsuya Aoyama; Wataru Ito; Shigeru Saotome, all of Kanagawa-ken, Japan

[73] Assignee: Fuji Photo Film Co., Ltd., Kanagawa, Japan

[21] Appl. No.: 474,729

[22] Filed: Jun. 7, 1995

[30] Foreign Application Priority Data

Jul. 4, 1994 [JP] Japan ................................. 6-152442

[51] Int. Cl.$^6$ ............................. G06K 9/00; G06K 9/38
[52] U.S. Cl. .................... 382/169; 382/172; 382/132; 382/131
[58] Field of Search ........................... 382/132, 131, 382/254, 270, 128, 172, 169, 274; 358/458

[56] References Cited

U.S. PATENT DOCUMENTS

| | | | |
|---|---|---|---|
| 4,792,979 | 12/1988 | Nomura et al. | 382/169 |
| 4,887,305 | 12/1989 | Shimura | 382/172 |
| 5,150,421 | 9/1992 | Morishita et al. | 382/169 |
| 5,287,418 | 2/1994 | Kishida | 382/169 |

FOREIGN PATENT DOCUMENTS

| | | | |
|---|---|---|---|
| 0110185 | 6/1984 | European Pat. Off. | 1/29 |
| 0156393 | 10/1985 | European Pat. Off. | G06F 15/68 |
| 0638874 | 2/1995 | European Pat. Off. | G06T 5/40 |
| 5323750 | 12/1993 | Japan | G03G 15/00 |

*Primary Examiner*—David K. Moore
*Assistant Examiner*—Wenpeng Chen
*Attorney, Agent, or Firm*—Sughrue, Mion, Zinn, Macpeak & Seas, PLLC

[57] ABSTRACT

A fundamental gradation curve is enlarged or reduced such that the minimum density and the maximum density represented by the fundamental gradation curve may be changed respectively to a desired minimum density and a desired maximum density. The enlarged or reduced fundamental gradation curve is translated such that a point corresponding to a predetermined density may be shifted to a point representing a desired density. The translated fundamental gradation curve is rotated around the point corresponding to the desired density such that this point may represent a desired contrast. The enlarged or reduced fundamental gradation curve and the rotated fundamental gradation curve are weighted and added such that the minimum density and the maximum density represented by the rotated fundamental gradation curve may be changed respectively to the desired minimum density and the desired maximum density, and such that the point corresponding to the desired density may represent the desired density and the desired contrast. A desired gradation curve is thereby obtained.

22 Claims, 12 Drawing Sheets

F I G. 4
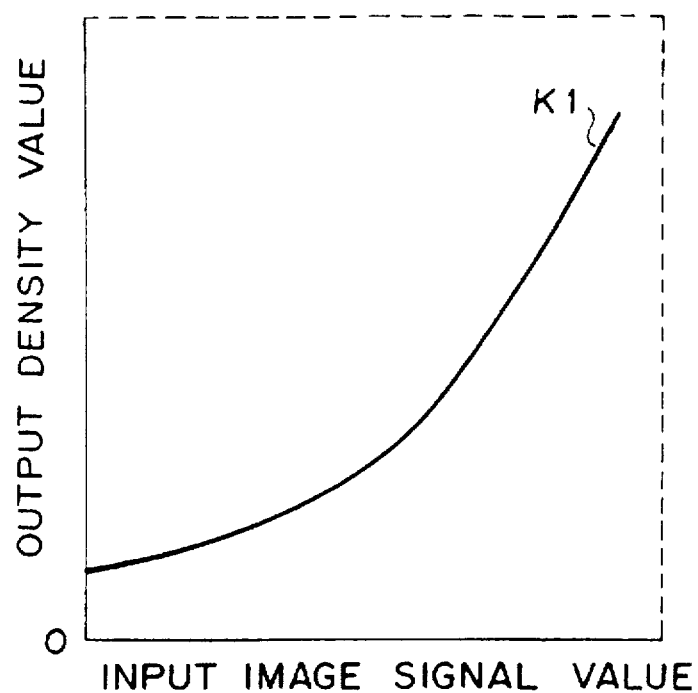
F I G. 5
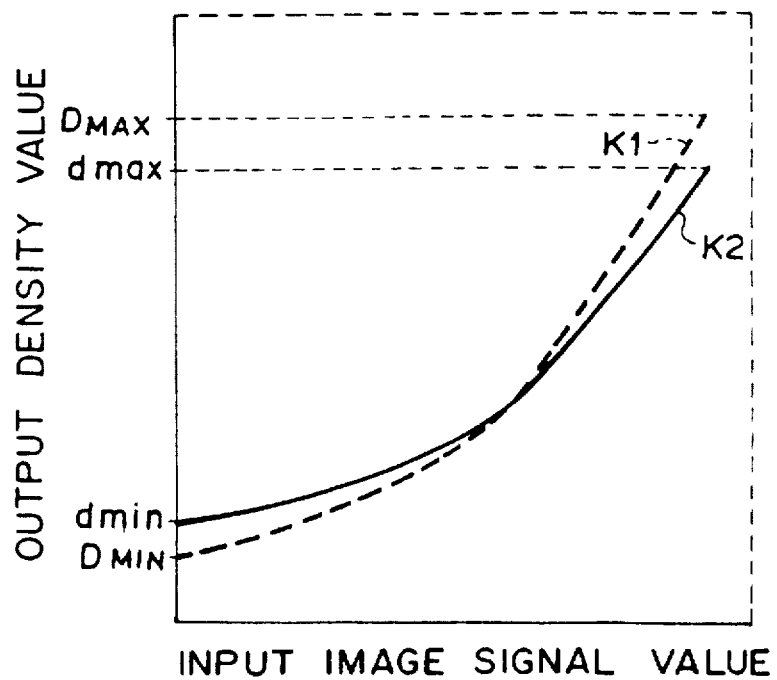

F I G. 12
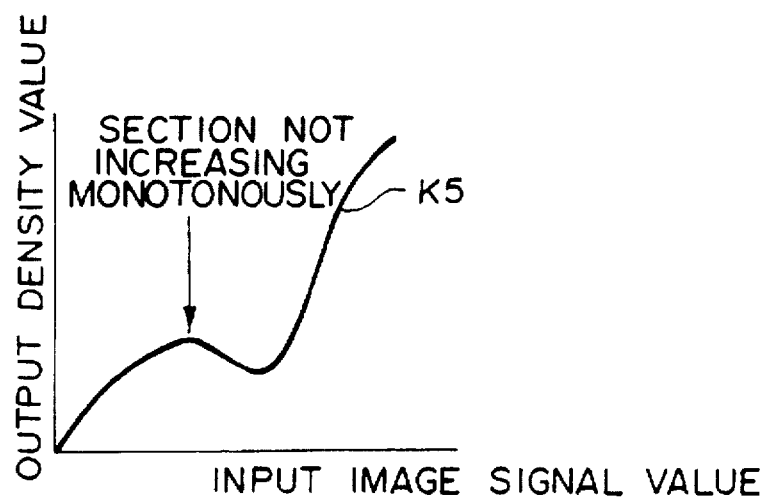
F I G. 13
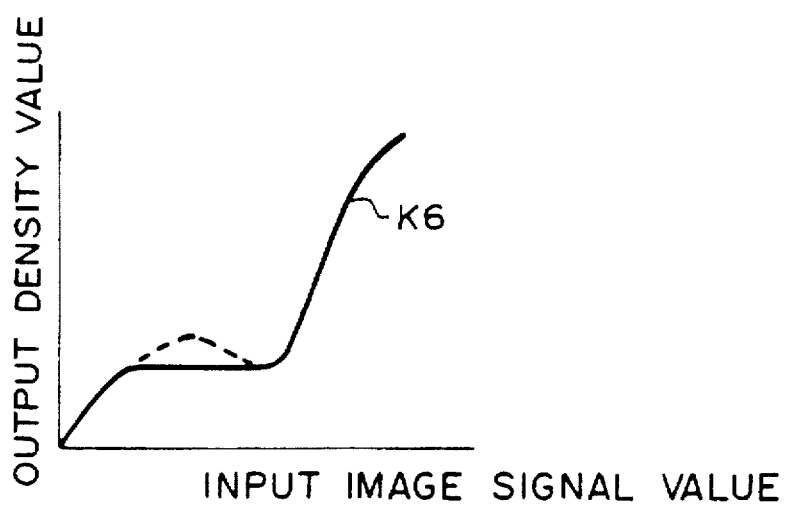
F I G. 14
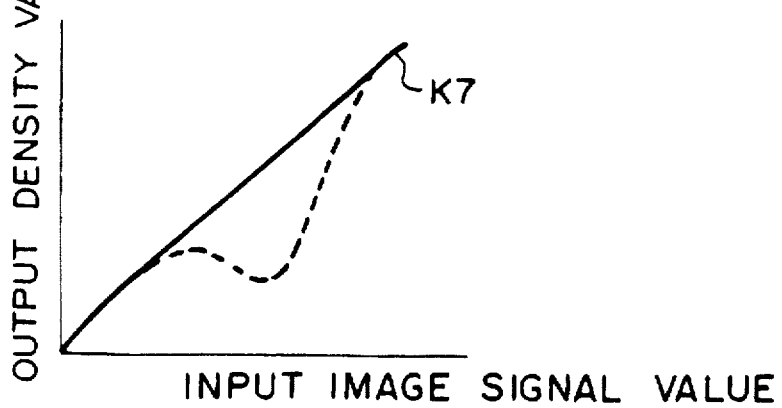

EMPHASIS OF LOW DENSITY

EMPHASIS OF INTERMEDIATE DENSITY

EMPHASIS OF HIGH DENSITY

DE-EMPHASIS OF INTERMEDIATE DENSITY

GRADATION CORRECTING METHOD AND APPARATUS

BACKGROUND OF THE INVENTION

1. Field of the Invention

This invention relates to a gradation correcting method and apparatus wherein a desired gradation curve is obtained by correcting a fundamental gradation curve, which serves as a reference gradation curve, such that a visible image having appropriate gradation can be reproduced from an image signal, which represents an image, in accordance with the desired gradation curve.

2. Description of the Related Art

Image reproducing apparatuses for exposing a photographic material to light, which has been modulated with an image signal representing an image, and thereby reproducing the image on the photographic material have heretofore been known in various fields.

For example, an X-ray image is recorded on an X-ray film having a small gamma value chosen according to the type of image processing to be carried out. the X-ray image is read out from the X-ray film and converted into an electric signal (i.e., an image signal), and the image signal is processed and then used for reproducing the X-ray image as a visible image on a photographic film, or the like, with an image reproducing apparatus. In this manner, a visible image having good image quality with high contrast, high sharpness, high graininess, or the like, can be reproduced.

Also, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a photographic film with an image reproducing apparatus.

In the aforesaid radiation image recording and reproducing systems, wherein the sheets of X-ray film or the stimulable phosphor sheets are utilized, gradation processing is often carried out by preparing a gradation correcting pattern serving as a density-image signal conversion pattern adapted to the object, the image of which is to be recorded, and the characteristics of the image, which is to be obtained. An image signal, which represents an image, is then subjected to a signal converting process in accordance with the gradation correcting pattern.

However, in cases where gradation correcting curves to be used in the aforesaid gradation processing are prepared in accordance with many kinds of objects, the images of which are to be recorded, and various characteristics of images, which are to be obtained, it becomes necessary to prepare several tens of kinds of the gradation correcting curves. Therefore, considerable labor is required to collect pieces of information, which are necessary for preparing the gradation correcting curves. Also, considerable storage capacity is required for an electronic computer, or the like, to store the collected information as digital signals. Thus the aforesaid technique for preparing the gradation correcting curves is not suitable for practical use.

Accordingly, a gradation correcting method has been proposed in order to eliminate the problems described above. With the proposed gradation correcting method, a signal level-density coordinate system, in which the density of a visible image is plotted on one of orthogonal coordinate axes, and the level of an image signal is plotted on the other axis, is prepared. Also, a reference gradation curve is created on the signal level-density coordinate system. The reference gradation curve is then rotated around a single point, which is located on the reference gradation curve, and is translated in parallel on the signal level-density coordinate system. In this manner, a desired gradation curve is obtained in accordance with predetermined image information and the characteristics of the image, which is to be obtained.

Also, a gradation correcting method has been proposed wherein, in order to obtain various gradation curves shown in FIGS. 15 and 16, the density and the contrast represented by a reference gradation curve as a whole are changed such that the reference gradation curve may become a gradation curve having a desired curved shape and a desired extent of change in the shape.

With the proposed gradation correcting method, as illustrated in FIG. 17, a fundamental gradation curve, which is indicated by the solid line, is reduced along the density axis, and a reduced gradation curve, which is indicated by the broken line, is thereby obtained. Thereafter, as illustrated in FIG. 18, the gradation curve is reduced along the input image signal axis, and the contrast represented by the gradation curve is thereby changed. In this manner, a desired gradation curve is obtained.

Further, a different gradation correcting method has been proposed in, for example, Japanese Unexamined Patent Publication No. 5(1993)-323750. With the proposed gradation correcting method, as illustrated in FIGS. 19A, 19B, 19C, and 19D, several characteristic fundamental gradation curves are prepared. A fundamental gradation curve, which is close to desired gradation, is selected from the fundamental gradation curves shown in FIGS. 19A, 19B, 19C, and 19D. Thereafter, the degree of emphasis of the selected gradation curve (i.e., the extent of bending of the gradation curve) is changed. In this manner, a desired gradation curve is obtained. With the proposed method, the degree of emphasis of gradation can be changed without the maximum density and the minimum density being changed.

When a visible image is reproduced from an image signal, it is desired to obtain an image having desired gradation by adjusting the gradation curve, which has been corrected with a gradation correcting method, such that the maximum density and the minimum density of a reproduced image can be set appropriately or such that the density and the contrast of part of the reproduced image can be varied.

However, with the aforesaid gradation correcting method, wherein the density and the contrast represented by a reference gradation curve as a whole are changed, the maximum density and the minimum density represented by the gradation curve after being corrected become different from the maximum density and the minimum density represented by the gradation curve before being corrected. Also, it is not possible to correct only a part of the gradation curve. Therefore, a reproduced image having density falling within a predetermined range cannot be obtained. Further, the density and the contrast of only a desired part of the image cannot be changed.

With the gradation correcting method proposed in, for example, Japanese Unexamined Patent Publication No.

5(1993)-323750, wherein the maximum density and the minimum density represented by a gradation curve are fixed and the extent of bending of the gradation curve as a whole is changed, though the maximum density and the minimum density represented by the gradation curve after being corrected do not change, the density and the contrast of only a desired part of the reproduced image cannot be changed.

SUMMARY OF THE INVENTION

The primary object of the present invention is to provide a gradation correcting method, wherein the maximum density and the minimum density of a reproduced image are capable of being set appropriately, and wherein the density and the contrast of part of the reproduced image are capable of being adjusted.

Another object of the present invention is to provide an apparatus for carrying out the gradation correcting method.

The present invention provides a gradation correcting method for use in an image reproducing method, wherein a desired gradation curve is obtained by correcting a fundamental gradation curve, which serves as a reference gradation curve, and a visible image having desired gradation is reproduced from an image signal, which represents an image, in accordance with the desired gradation curve, the gradation correcting method comprising the steps of:

i) setting a signal level-density coordinate system, in which the density of the visible image is plotted on one of orthogonal coordinate axes, and the level of the image signal is plotted on the other axis, and which is thus constituted of the density axis and the signal level axis, ii) enlarging or reducing the fundamental gradation curve along the density axis on the signal level-density coordinate system such that the minimum density and the maximum density, which are represented by the fundamental gradation curve, may be changed respectively to a desired minimum density and a desired maximum density, an enlarged or reduced fundamental gradation curve being thereby obtained, iii) translating the enlarged or reduced fundamental gradation curve in parallel with the density axis such that a point, which is located on the enlarged or reduced fundamental gradation curve and which corresponds to a predetermined density, may be shifted to a point representing a desired density, a translated fundamental gradation curve being thereby obtained, iv) rotating the translated fundamental gradation curve by a predetermined angle around the point, which is located on the translated fundamental gradation curve and which corresponds to the desired density, such that the point corresponding to the desired density may represent a desired contrast, a rotated fundamental gradation curve being thereby obtained, and v) weighting the enlarged or reduced fundamental gradation curve and the rotated fundamental gradation curve with predetermined weight factors, and adding the weighted gradation curves to each other such that the minimum density and the maximum density, which are represented by the rotated fundamental gradation curve, may be changed respectively to the desired minimum density and the desired maximum density, and such that the point corresponding to the desired density may represent the desired density and the desired contrast, whereby the desired gradation curve is obtained.

The term "gradation curve" as used herein means a characteristic curve, which represents the relationship between the level of an image signal, which is obtained by photoelectrically converting the luminance of an object, and the optical density of a final reproduced image. Such a characteristic curve is ordinarily used in the field for dealing with images.

The present invention also provides an apparatus for carrying out the gradation correcting method. Specifically, the present invention also provides a gradation correcting apparatus for use in an image reproducing apparatus, wherein a desired gradation curve is obtained by correcting a fundamental gradation curve, which serves as a reference gradation curve, and a visible image having desired gradation is reproduced from an image signal, which represents an image, in accordance with the desired gradation curve, the gradation correcting apparatus comprising:

i) a fundamental gradation curve storage means for storing information representing the fundamental gradation curve, which serves as the reference gradation curve, on a signal level-density coordinate system, in which the density of the visible image is plotted on one of orthogonal coordinate axes, and the level of the image signal is plotted on the other axis, and which is thus constituted of the density axis and the signal level axis, ii) an enlargement and reduction means for enlarging or reducing the fundamental gradation curve along the density axis on the signal level-density coordinate system such that the minimum density and the maximum density, which are represented by the fundamental gradation curve stored in the fundamental gradation curve storage means, may be changed respectively to a desired minimum density and a desired maximum density, an enlarged or reduced fundamental gradation curve being thereby obtained, iii) a translation means for translating the enlarged or reduced fundamental gradation curve, which has been obtained from the enlargement and reduction means, in parallel with the density axis such that a point, which is located on the enlarged or reduced fundamental gradation curve and which corresponds to a predetermined density, may be shifted to a point representing a desired density, a translated fundamental gradation curve being thereby obtained, iv) a rotation means for rotating the translated fundamental gradation curve, which has been obtained from the translation means, by a predetermined angle around the point, which is located on the translated fundamental gradation curve and which corresponds to the desired density, such that the point corresponding to the desired density may represent a desired contrast, a rotated fundamental gradation curve being thereby obtained, and v) a weighting and addition means for weighting the enlarged or reduced fundamental gradation curve and the rotated fundamental gradation curve, which has been obtained from the rotation means, with predetermined weight factors, and adding the weighted gradation curves to each other such that the minimum density and the maximum density, which are represented by the rotated fundamental gradation curve, may be changed respectively to the desired minimum density and the desired maximum density, and such that the point corresponding to the desired density may represent the desired density and the desired contrast.

In the gradation correcting method and apparatus in accordance with the present invention, the predetermined weight factors should preferably be set such that the desired gradation curve may come into smooth contact with the rotated fundamental gradation curve at the point corresponding to the desired density. Also, the predetermined weight factors should preferably be set such that the desired gradation curve may come into smooth contact with the enlarged or reduced fundamental gradation curve at points, which correspond respectively to the desired minimum density and the desired maximum density.

Further, information representing a plurality of fundamental gradation curves may be stored in the storage means, a single fundamental gradation curve may be selected from the plurality of the fundamental gradation curves, and the single selected fundamental gradation curve is subjected to the enlargement or reduction, the translation, the rotation, and the weighting and addition.

Furthermore, the desired gradation curve may be taken as the fundamental gradation curve, and the enlargement or reduction, the translation, the rotation, and the weighting and addition may be repeated for the fundamental gradation curve.

With the gradation correcting method and apparatus in accordance with the present invention, the fundamental gradation curve, which serves as the reference gradation curve for correction of the gradation, is enlarged or reduced such that the minimum density and the maximum density, which are represented by the fundamental gradation curve, may be changed respectively to a desired minimum density and a desired maximum density, and an enlarged or reduced fundamental gradation curve is thereby obtained. The enlarged or reduced fundamental gradation curve is then translated and rotated such that the point on the enlarged or reduced fundamental gradation curve, which point corresponds to a predetermined density and represents an image portion to be used and therefore required to have an appropriate image density in the reproduced image, may be shifted to a point representing a desired density and a desired contrast. A rotated fundamental gradation curve is thus obtained. The enlarged or reduced fundamental gradation curve and the rotated fundamental gradation curve are weighted with predetermined weight factors, and the weighted fundamental gradation curves are added to each other such that the minimum density and the maximum density, which are represented by the rotated fundamental gradation curve, may be changed respectively to the desired minimum density and the desired maximum density, and such that the point corresponding to the desired density may represent the desired density and the desired contrast. Also, the fundamental gradation curve is corrected by weighting the enlarged or reduced fundamental gradation curve and the rotated fundamental gradation curve and adding the weighted gradation curves to each other such that the value of the weight factor for the enlarged or reduced fundamental gradation curve may be equal to 1 at the points on the gradation curve, at which the signal value takes the minimum value and the maximum value, and such that the value of the weight factor for the rotated fundamental gradation curve may be equal to 1 at the point on the gradation curve, which point corresponds to the desired density. In this manner, a desired gradation curve is obtained, in which the maximum density and the minimum density coincide respectively with the desired maximum density and the desired minimum density and part corresponding to the desired density represents the desired density and the desired contrast.

Therefore, when a visible image is reproduced from the image signal in accordance with the desired gradation curve, a visible image can be obtained such that the image may have the image density falling within the desired minimum density and the desired maximum density, and such that the image portion, which corresponds to the predetermined density and which is to be used and therefore required to have an appropriate image density in the reproduced image, may have the desired density and the desired contrast.

Also, with the gradation correcting method and apparatus in accordance with the present invention, the desired gradation curve can be set in accordance with the kind of the image signal obtained from one of various images, such as a radiation image, an image obtained with tomography, and a electron microscope image. Therefore, an image having the desired gradation can be reproduced regardless of the kind of the reproduced image.

Further, in the gradation correcting method and apparatus in accordance with the present invention, the predetermined weight factors may be set such that the desired gradation curve may come into smooth contact with the rotated fundamental gradation curve at the point, which corresponds to the desired density. Furthermore, the predetermined weight factors may be set such that the desired gradation curve may come into smooth contact with the enlarged or reduced fundamental gradation curve at the points, which correspond respectively to the desired minimum density and the desired maximum density. In such cases, the desired gradation curve comes into smooth contact with the enlarged or reduced fundamental gradation curve and the rotated fundamental gradation curve. Therefore, a visible image having natural visual impression can be reproduced in accordance with the desired gradation curve.

Moreover, in cases where a plurality of fundamental gradation curves are prepared and a single fundamental gradation curve to be corrected is selected from the plurality of the fundamental gradation curves, the fundamental gradation curve to be corrected can be selected appropriately from a wide variety of the fundamental gradation curves.

Furthermore, the desired gradation curve may be taken as the fundamental gradation curve, and the fundamental gradation curve may be corrected repeatedly. In such cases, a desired gradation curve representing more desirable density and contrast can be obtained. Therefore, an image having more appropriate image density and contrast can be obtained in accordance with the corrected gradation curve.

BRIEF DESCRIPTION OF THE DRAWINGS

FIG. 4 is a graph showing an example of a fundamental gradation curve, FIG. 5 is an explanatory graph showing how the fundamental gradation curve is enlarged or reduced, FIG. 12 is a graph showing a gradation curve having a section, in which the output density value does not increase monotonously, FIG. 13 is a graph showing an example of how the gradation curve having the section, in which the output density value does not increase monotonously, is corrected, FIG. 14 is a graph showing a different example of how the gradation curve having the section, in which the output density value does not increase monotonously, is corrected.

DESCRIPTION OF THE PREFERRED EMBODIMENTS

The present invention will hereinbelow be described in further detail with reference to the accompanying drawings.

Figure 1:
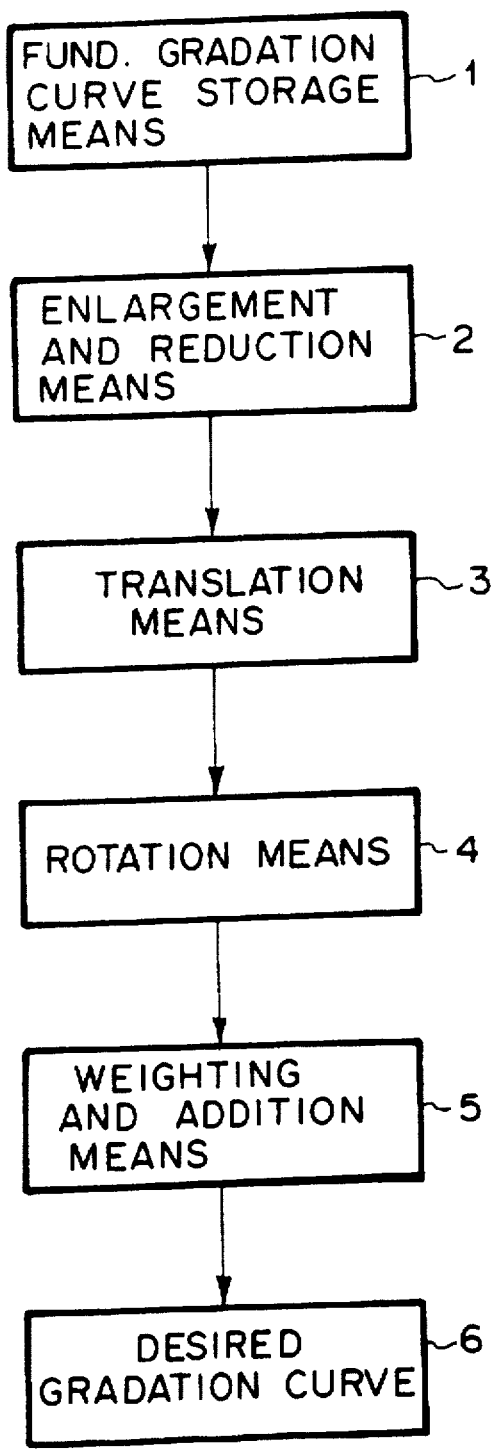
FIG. 1 is a block diagram showing the gradation correcting apparatus in accordance with the present invention.

FIG. 1 is a block diagram showing the gradation correcting apparatus in accordance with the present invention. As illustrated in FIG. 1, the gradation correcting apparatus in accordance with the present invention comprises a fundamental gradation curve storage means 1 for storing information representing the fundamental gradation curve, which serves as the reference gradation curve, on a signal level-density coordinate system, in which the density of the visible image is plotted on one of orthogonal coordinate axes, and the level of the image signal is plotted on the other axis, and which is thus constituted of the density axis and the signal level axis. The gradation correcting apparatus in accordance with the present invention also comprises an enlargement and reduction means 2 for enlarging or reducing the fundamental gradation curve along the density axis on the signal level-density coordinate system such that the minimum density and the maximum density, which are represented by the fundamental gradation curve stored in the fundamental gradation curve storage means 1, may be changed respectively to a desired minimum density and a desired maximum density, an enlarged or reduced fundamental gradation curve being thereby obtained. The gradation correcting apparatus in accordance with the present invention further comprises a translation means 3 for translating the enlarged or reduced fundamental gradation curve, which has been obtained from the enlargement and reduction means 2, in parallel with the density axis such that a point, which is located on the enlarged or reduced fundamental gradation curve and which corresponds to a predetermined density, may be shifted to a point representing a desired density, a translated fundamental gradation curve being thereby obtained. The gradation correcting apparatus in accordance with the present invention still further comprises a rotation means 4 for rotating the translated fundamental gradation curve, which has been obtained from the translation means 3, by a predetermined angle around a point, which is located on the translated fundamental gradation curve and which corresponds to the desired density, such that the point corresponding to the desired density may represent a desired contrast, a rotated fundamental gradation curve being thereby obtained. The gradation correcting apparatus in accordance with the present invention also comprises a weighting and addition means 5 for weighting the enlarged or reduced fundamental gradation curve and the rotated fundamental gradation curve, which has been obtained from the rotation means 4, with predetermined weight factors, and adding the weighted gradation curves to each other such that the minimum density and the maximum density, which are represented by the rotated fundamental gradation curve, may be changed respectively to the desired minimum density and the desired maximum density, and such that the point corresponding to the desired density may represent the desired density and the desired contrast. The fundamental gradation curve is corrected and a desired gradation curve 6 is obtained with the fundamental gradation curve storage means 1, the enlargement and reduction means 2, the translation means 3, the rotation means 4, and the weighting and addition means 5.

An embodiment of the gradation correcting apparatus in accordance with the present invention will be described hereinbelow.

Figure 2:
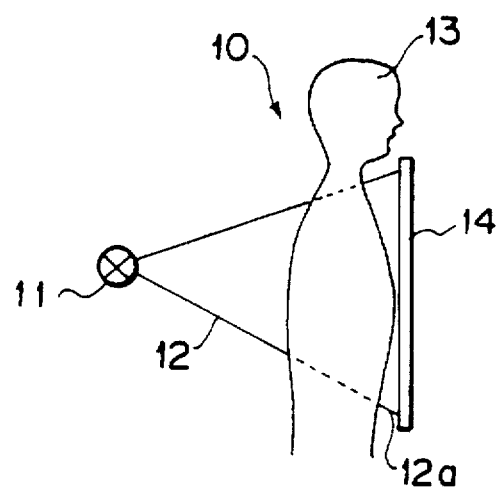
FIG. 2 is a schematic view showing an example of a radiation image recording apparatus.

FIG. 2 is a schematic view showing an example of a radiation image recording apparatus.

With reference to FIG. 2, a radiation image recording apparatus 10 is provided with a radiation source 11, which produces radiation 12. The radiation 12 is delivered to an object 13, such as a human body, and radiation 12a passes through the object 13. The radiation 12a, which has passed through the object 13, impinges upon a stimulable phosphor sheet 14. In this manner, a radiation image of the object 13 is stored on the stimulable phosphor sheet 14.

Figure 3:
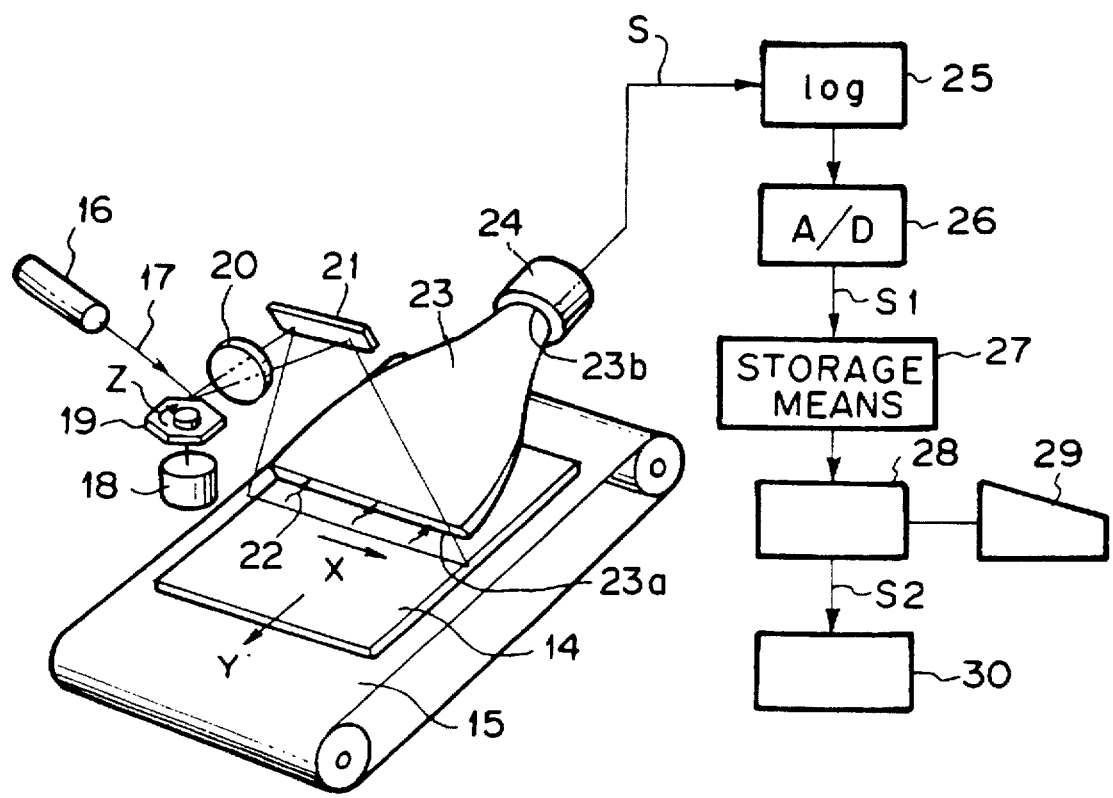
FIG. 3 is a schematic view showing an example of a radiation image read-out apparatus.

FIG. 3 is a schematic view showing an example of a radiation image read-out apparatus.

The stimulable phosphor sheet 14, on which the radiation image has been stored in the manner described above, is placed at a predetermined position in the radiation image read-out apparatus shown in FIG. 3.

The stimulable phosphor sheet 14, which has been placed at the predetermined position in the radiation image read-out apparatus, is conveyed in a sub-scanning direction indicated by the arrow Y by a sheet conveyance means 15, which may be constituted of an endless belt, or the like, and which is operated by an operating means (not shown). A laser beam 17 is produced by a laser beam source 16. The laser beam 17 is reflected and deflected by a rotating polygon mirror 19, which is quickly rotated by a motor 18 in the direction indicated by the arrow Z. Thereafter, the laser beam 17 passes through a converging lens 20, which may be constituted of an fθ lens, or the like. The direction of the optical path of the laser beam 17 is then changed by a mirror 21. The laser beam 17 impinges upon the stimulable phosphor sheet 14 and scans it in a main scanning direction indicated by the arrow X. The main scanning direction is approximately normal to the sub-scanning direction indicated by the arrow Y.

When the stimulable phosphor sheet 14 is exposed to the laser beam 17, the exposed portion of the stimulable phosphor sheet 14 emits light 22 in an amount proportional to the amount of energy stored thereon during its exposure to radiation. The emitted light 22 is guided by a light guide member 23 and photoelectrically detected by a photomultiplier 24. The light guide member 23 is made from a light guiding material, such as an acrylic plate. The light guide member 23 has a linear light input face 23a, which is positioned so that it may extend along the main scanning line on the stimulable phosphor sheet 14, and a ring-shaped light output face 23b, which is positioned so that it may be in close contact with a light receiving face of the photomultiplier 24. The emitted light 22, which has entered the light guide member 23 from its light input face 23a, is guided through repeated total reflection inside of the light guide member 23, emanates from the light output face 23b, and is received by the photomultiplier 24. In this manner, the amount of the emitted light 22 carrying the radiation image is converted into an electric signal by the photomultiplier 24.

An analog signal S is generated by the photomultiplier 24. The analog signal S is logarithmically amplified by a logarithmic amplifier 25, and the amplified analog signal S is fed into an analog-to-digital converter 26. In the analog-to-digital converter 26, the amplified analog signal S is sampled at time intervals corresponding to the predetermined sampling intervals on the stimulable phosphor sheet 14, and the sampled image signal is digitized into a digital image signal S1. The image signal S1 is stored in a storage means 27 and is thereafter fed into an image processing unit 28.

The image processing unit 28 is provided with an embodiment of the gradation correcting apparatus in accordance with the present invention. Specifically, the image processing unit 28 is provided with the fundamental gradation curve storage means 1, the enlargement and reduction means 2, the translation means 3, the rotation means 4, and the weighting and addition means 5, which are shown in FIG. 1. The image processing unit 28 receives information, which represents the density, the contrast, or the like, from an input means 29 and carries out the processes in the respective means.

FIG. 4 is a graph showing an example of the fundamental gradation curve, which is stored in the fundamental gradation curve storage means 1 of the image processing unit 28. As illustrated in FIG. 4, a fundamental gradation curve K1 is set on a signal level-density coordinate system, in which the density value of a visible image is plotted on the vertical axis, and the level of the image signal is plotted on the horizontal axis, and which is thus constituted of the density axis and the signal level axis. In this embodiment, a desired gradation curve is obtained by correcting the fundamental gradation curve K1 illustrated in FIG. 4.

First, in the enlargement and reduction means 2, the fundamental gradation curve K1 is enlarged or reduced. Specifically, as illustrated in FIG. 5, the fundamental gradation curve K1 is enlarged or reduced along the density axis on the signal level-density coordinate system such that the maximum density Dmax and the minimum density Dmin, which are represented by the fundamental gradation curve K1, may be changed respectively to a desired maximum density dmax and a desired minimum density dmin, which have been designated from the input means 29. In this manner, an enlarged or reduced fundamental gradation curve K2 is obtained.

Figure 6:
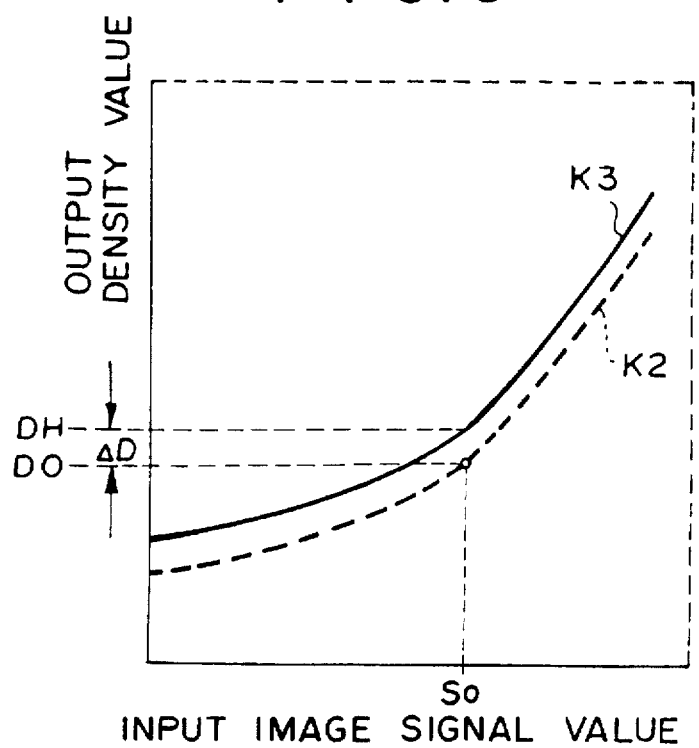
FIG. 6 is an explanatory graph showing how the fundamental gradation curve is translated.

Thereafter, in the translation means 3, the enlarged or reduced fundamental gradation curve K2, which has been obtained from the enlargement and reduction means 2, is translated in parallel with the density axis such that a point, which is located on the enlarged or reduced fundamental gradation curve K2 and which corresponds to a predetermined density, may be shifted to a point representing a desired density. Specifically, the information representing a density value DO, which corresponds to a desired image density, is fed from the input means 29. Also, the information representing a desired density value DH, to which the density value DO is to be shifted, is fed from the input means 29. In the translation means 3, a translation distance $\Delta D$, by which the enlarged or reduced fundamental gradation curve K2 is to be translated in parallel with the density axis, is calculated from the density value DO and the desired density value DH. Also, as illustrated in FIG. 6, the enlarged or reduced fundamental gradation curve K2 is translated by the calculated distance $\Delta D$, and a translated fundamental gradation curve K3 is thereby obtained. Instead of the density value DO and the desired density value DH being designated, for example, the difference $\Delta D$ between the density value DO and the desired density value DH may be designated.

Figure 7:
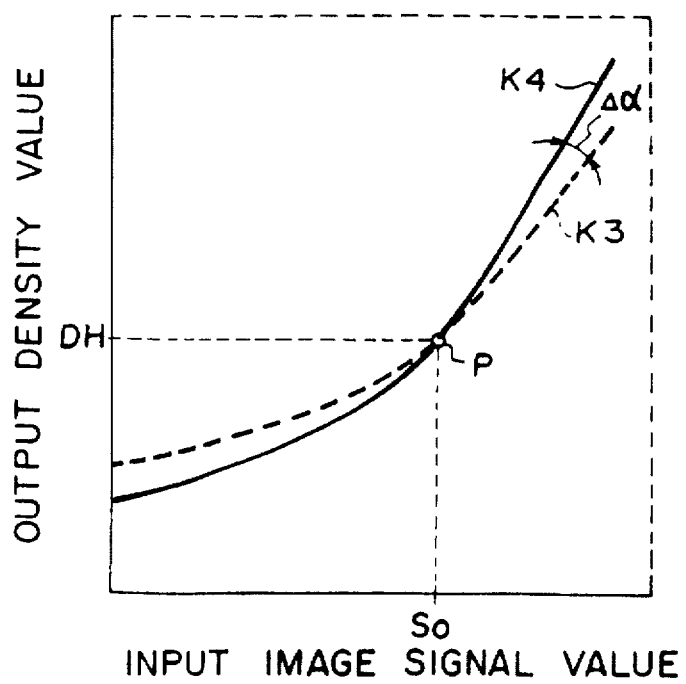
FIG. 7 is an explanatory graph showing how the fundamental gradation curve is rotated.

Thereafter, in the rotation means 4, the translated fundamental gradation curve K3, which has been obtained from the translation means 3, is rotated by a predetermined angle around a point, which is located on the translated fundamental gradation curve K3 and which corresponds to the desired density, such that the point corresponding to the desired density may represent a desired contrast. Specifically, the information representing a rotation angle $\Delta\alpha$, by which the translated fundamental gradation curve K3 is to be rotated, is fed from the input means 29. In the rotation means 4, as illustrated in FIG. 7, the translated fundamental gradation curve K3 is rotated by the designated rotation angle $\Delta\alpha$ around the point P corresponding to the desired density. In this manner, a rotated fundamental gradation curve K4 is obtained.

Figure 8:
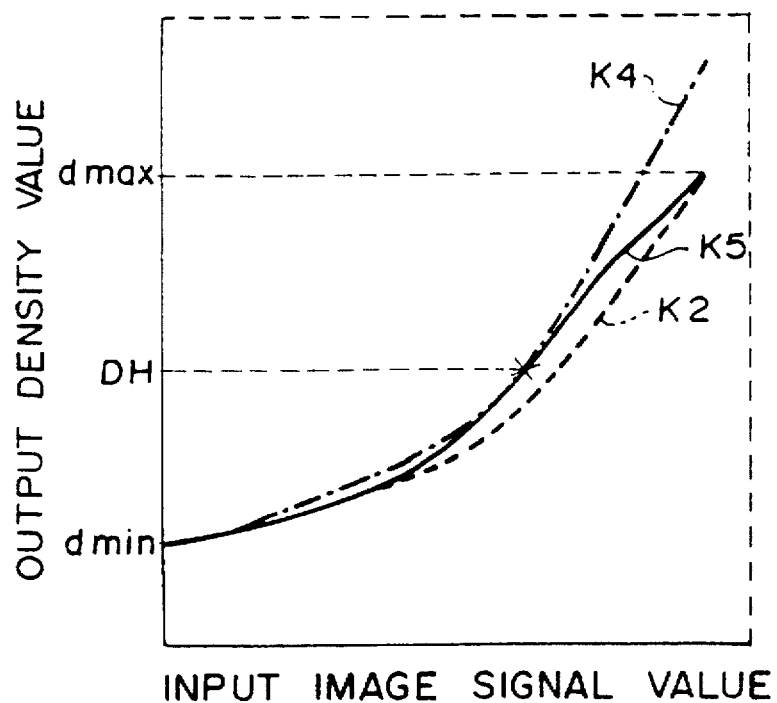
FIG. 8 is an explanatory graph showing how the weighting and addition process is carried out on an enlarged or reduced fundamental gradation curve and a rotated fundamental gradation curve.
Figure 9:
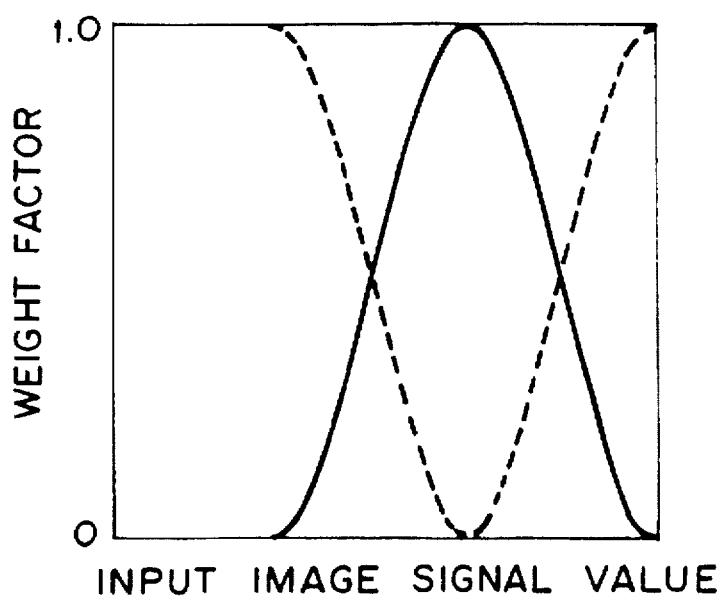
FIG. 9 is a graph showing a weight factor employed in the weighting and addition process.

Thereafter, in the weighting and addition means 5, the enlarged or reduced fundamental gradation curve K2 and the rotated fundamental gradation curve K4, which has been obtained from the rotation means 4, are weighted with predetermined weight factors, and the weighted gradation curves are added to each other such that the minimum density and the maximum density, which are represented by the rotated fundamental gradation curve K4, may be changed respectively to the desired minimum density dmin and the desired maximum density dmax, and such that the point P corresponding to the desired density, may represent the desired density value DH and the desired contrast. In this manner, a desired gradation curve K5 is obtained from the weighted addition of the enlarged or reduced fundamental gradation curve K2 and the rotated fundamental gradation curve K4. Specifically, the calculation is represented by the formula $$K5 = W \times K4 + (1-W) \times K2 \tag{1}$$

wherein W represents the weight factor. An example of the weight factor is shown in FIG. 9. In the weighting and addition means 5, the calculation represented by Formula (1) is carried out with the weight factor W, and the desired gradation curve K5 shown in FIG. 8 is thereby obtained.

The weight factor W is set such that the minimum density and the maximum density, which are represented by the rotated fundamental gradation curve K4 obtained from the rotation means 4, may be changed respectively to the desired minimum density dmin and the desired maximum density dmax, and such that the point P corresponding to the desired density may represent the desired density value DH and the desired contrast. Specifically, a heavy weight is given to part of the rotated fundamental gradation curve K4 in the vicinity of the point P. Also, heavy weights are given to parts of the enlarged or reduced fundamental gradation curve K2 in the vicinity of the points corresponding to the maximum density and the minimum density. Further, the value of the weight factor W is changed continuously such that the desired gradation curve K5 may come into smooth contact with the rotated fundamental gradation curve K4 at the point P corresponding to the desired density, and such that the desired gradation curve K5 may come into smooth contact with the enlarged or reduced fundamental gradation curve K2 at the points, which correspond respectively to the desired minimum density and the desired maximum density. In cases where the value of the weight factor W is changed continuously, a visible image having natural visual impression can be reproduced in accordance with the corrected gradation curve.

Figure 10:
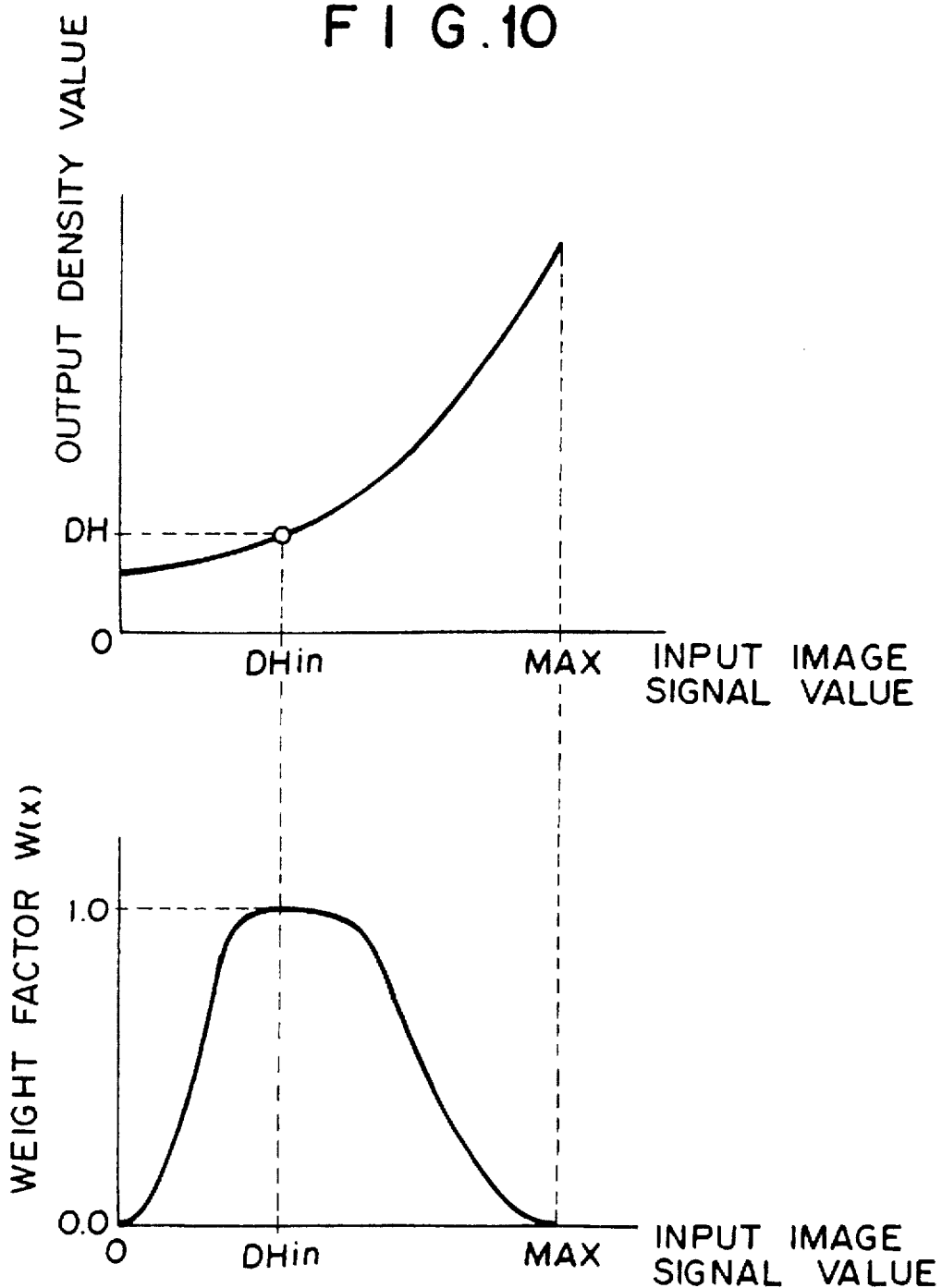
FIG. 10 is an explanatory diagram showing an example of how a weight factor is determined.

An example of how the weight factor W is set will be described hereinbelow. In this example, the value of the weight factor W is calculated by using a quartic polynomial, and the altered density and the altered contrast affect over the entire range of the desired gradation curve K5. As illustrated in FIG. 10, the input digital value corresponding to the desired density value DH is represented by DHin, and each input digital value is represented by x. The value of the weight factor W(x) is determined with respect to each of the section of x<DHin and the section of DHin<x. The conditions for the determination of the value of the weight factor with respect to each section are shown below.

| When x < DHin | | When DHin < x |
|---|---|---|
| W (0) = 0 | ... 1. ... | W (DHin) = 1 |
| W (DHin) = 1 | ... 2. ... | W (MAX) = 0 |
| W' (0) = 0 | ... 3. ... | W' (DHin) = 1 |
| W' (DHin) = 0 | ... 4. ... | W' (MAX) = 0 |
| W" (k1) = 0 | ... 5. ... | W" (k2) = 0 |
| (0 < k1 < DHin) | | (DHin < k2 < MAX) |

These formulas represent the conditions described below.

1., 2. . . . Conditions for satisfying the effects of the enlarged or reduced fundamental gradation curve K2 and the rotated fundamental gradation curve K4.

3., 4. . . . Conditions for obtaining smooth gradation.

5. . . . Conditions for adjusting the extent of effects of the altered density and contrast upon the desired gradation curve K5.

In the formulas of 5., in cases where k1 and k2 are close to DHin, the range, in which the effects upon the desired gradation curve K5 are large, becomes narrow.

Figure 11:
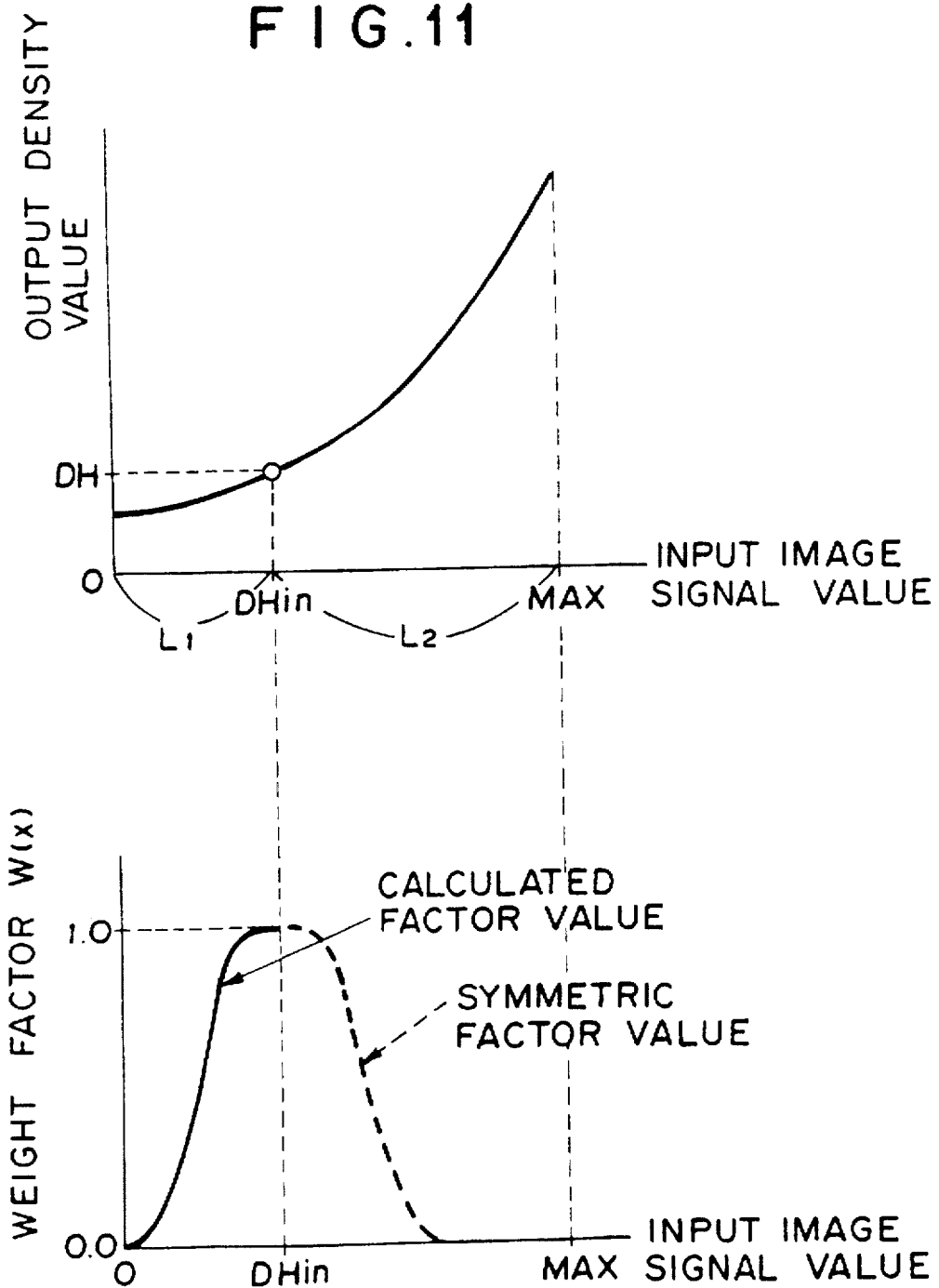
FIG. 11 is an explanatory diagram showing a different example of how a weight factor is determined.
Figure 15:
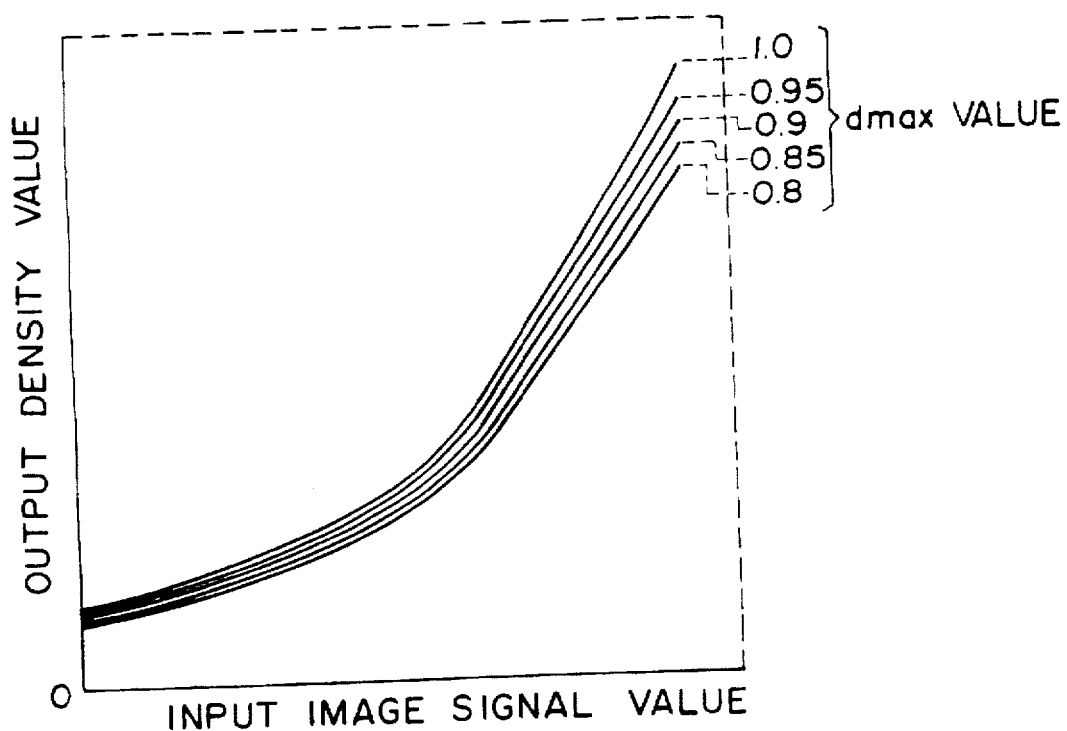
FIG. 15 is an explanatory graph showing a conventional gradation correcting method.
Figure 16:
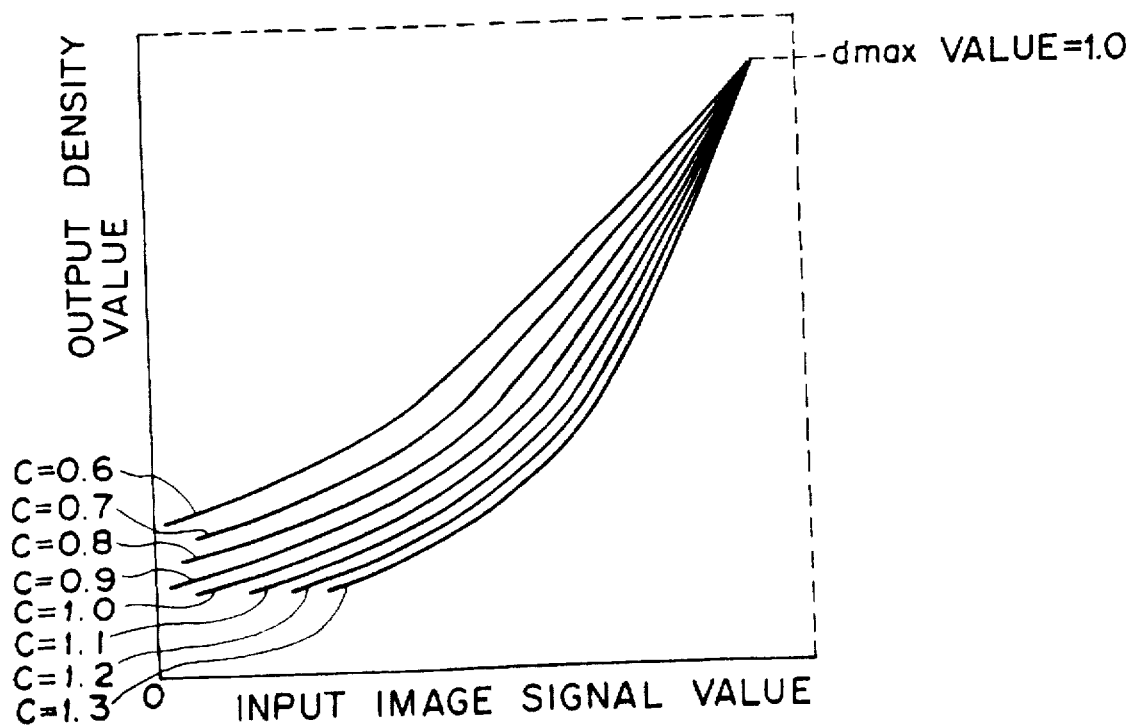
FIG. 16 is an explanatory graph showing a conventional gradation correcting method.
Figure 17:
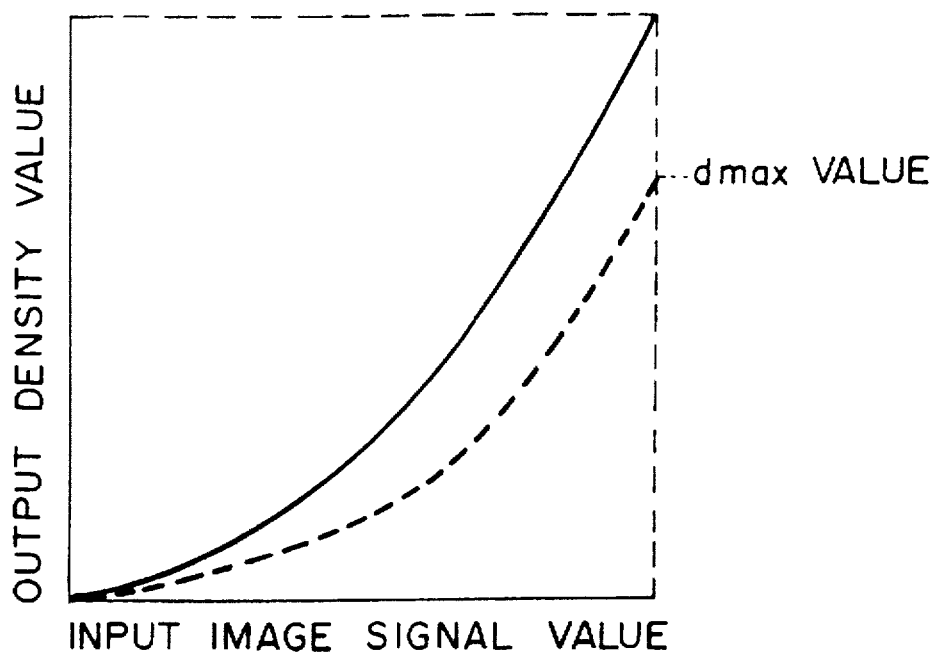
FIG. 17 is an explanatory graph showing a conventional gradation correcting method.
Figure 18:
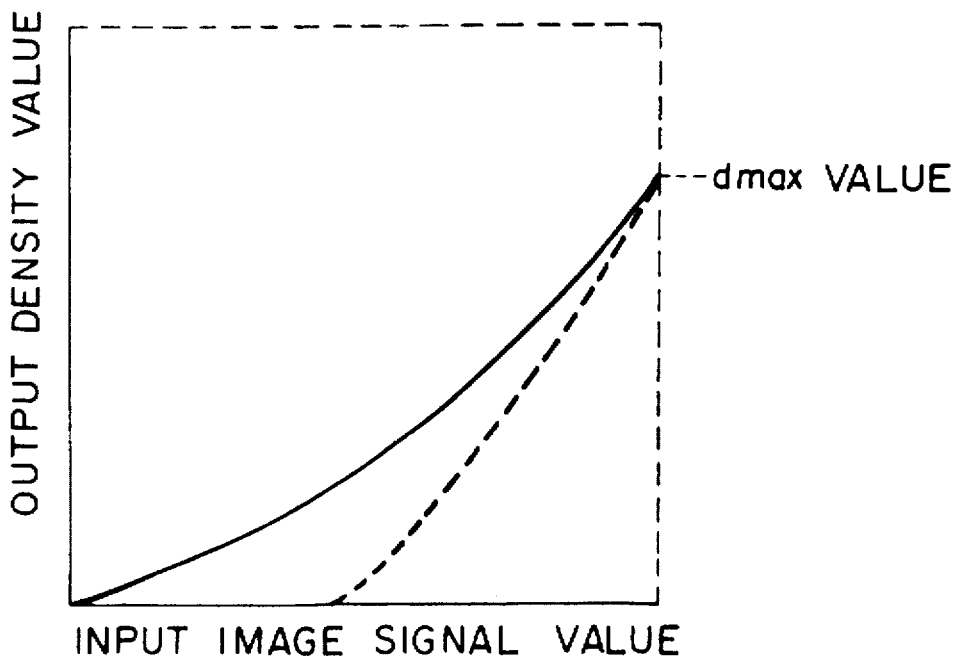
FIG. 18 is an explanatory graph showing a conventional gradation correcting method.
Figure 19A:
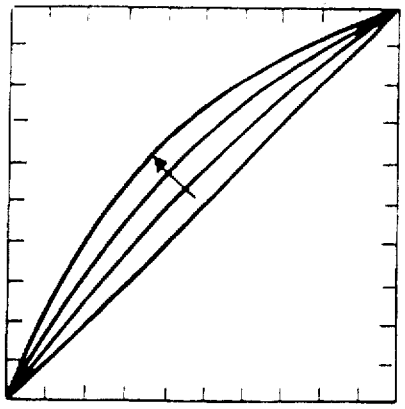
FIGS. 19A, 19B, 19C, and 19D are explanatory graphs showing a conventional gradation correcting method.
Figure 19C:
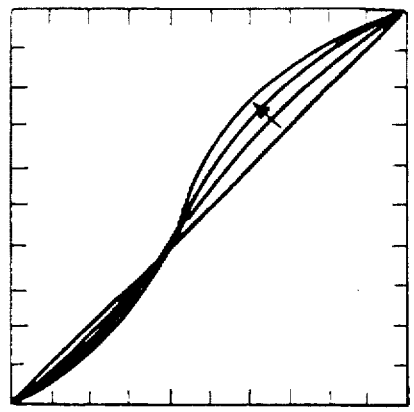
Figure 19B:
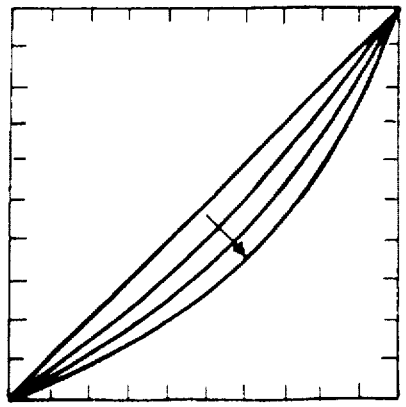
Figure 19D:
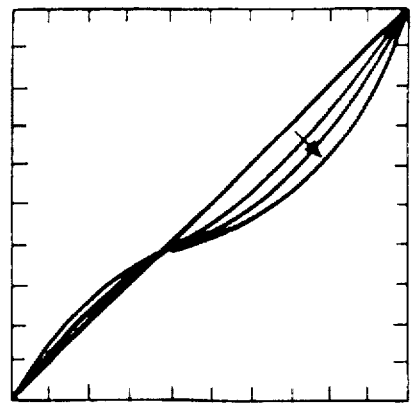

In this example, the altered density and the altered contrast affect over the entire range of the desired gradation curve K5. Alternatively, the weight factor may be set such that the altered density and the altered contrast affect over only a limited range of the desired gradation curve K5. Such an example will be described hereinbelow with reference to FIG. 11. With reference to FIG. 11, the range from 0 to DHin is represented by L1, and the range from DHin to MAX is represented by L2. In such cases, the value of the weight factor is determined for the range L1 or the range L2, whichever is narrower. As for the other range, the value of the weight factor symmetric to the value for the narrower range with respect to the line at DHin is set. In cases where such a weight function is set, when the density and the contrast at a point extremely close to the minimum density (or the maximum density) are altered, it is possible to prevent the problems from occurring in that the effects of the alteration extend to the maximum density side (or the minimum density side). In this manner, only a part of the gradation curve can be corrected. An example of the weight factor obtained in this manner is shown in FIG. 9.

In the two examples described above, the value of the weight factor W is calculated by using a quartic polynomial. However, no limitation is imposed on how the value of the weight factor W is calculated. One of the other polynomials, a trigonometric function, an exponential function, or the like, may be utilized for this purpose.

Instead of the weighting and addition being carried out, the desired gradation curve K5 may be obtained by calculating with the formula $$K5 = \sqrt{(K4)^k \cdot (K2)^{2-k}} \quad 0 \leq k \leq 2$$

wherein k is approximately equal to 0 at points in the vicinity of the maximum density and in the vicinity of the minimum density, and is approximately equal to 2 at a point in the vicinity of the desired density. Any of calculation processes may be employed, with which the combining ratio can be altered in accordance with the input value.

The desired gradation curve K5 is obtained in the manner described above. Thereafter, in the image processing unit 28, the image signal S1 is processed in accordance with the desired gradation curve K5, and a processed image signal S2 is thereby obtained. The processed image signal S2 is fed into an image reproducing means 30, such as a laser printer or a cathode ray tube display device, and is used for reproducing a visible image.

Figure 20:
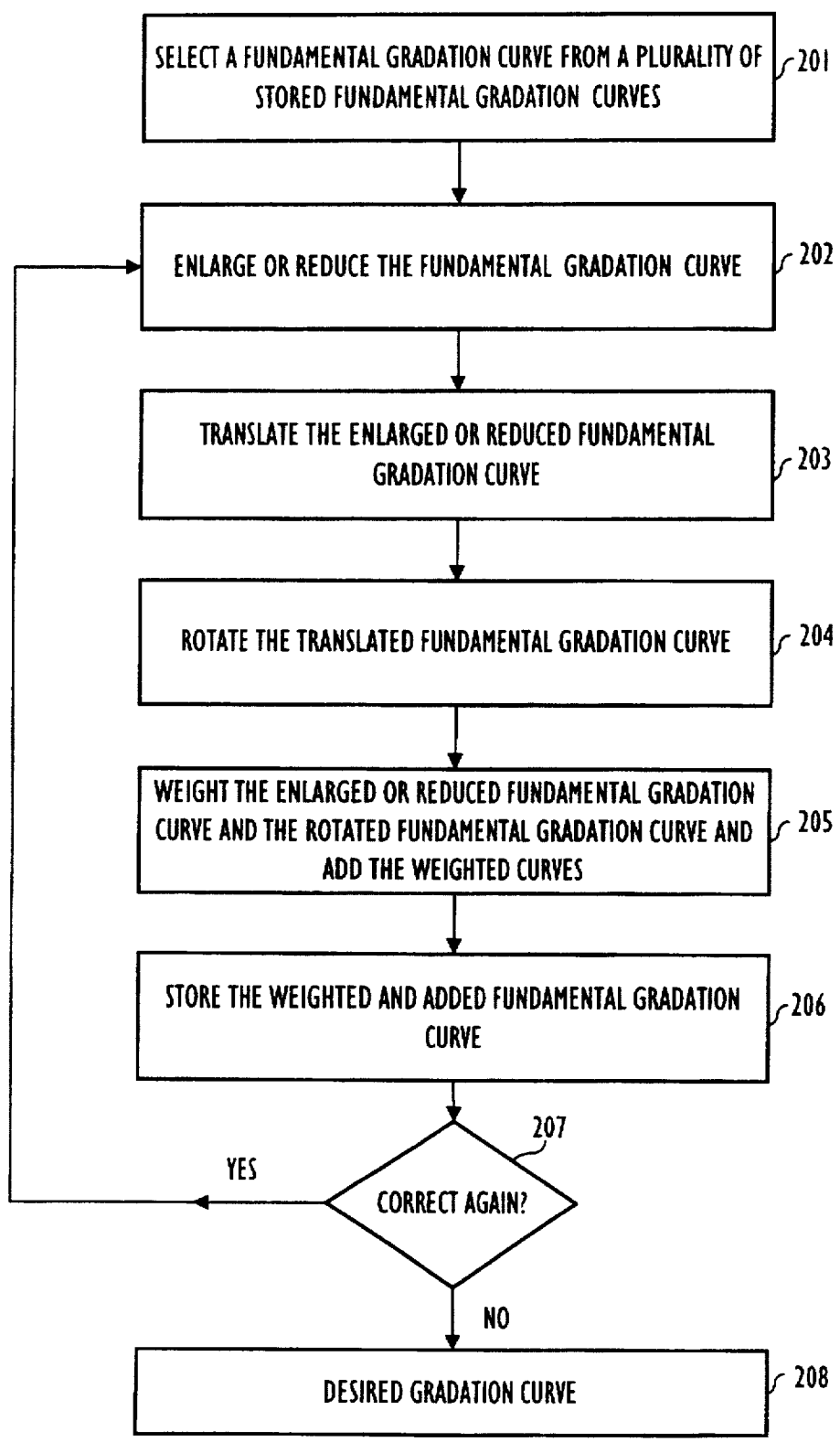
FIG. 20 is a flow chart showing the steps of the present invention.

As shown in FIG. 20, information representing a plurality of fundamental gradation curves may be stored in the storage means, a single fundamental gradation curve may be selected from the plurality of the fundamental gradation curves (step 201), and the single selected fundamental gradation curve is subjected to enlargement or reduction (step 202), translation (step 203), rotation (step 204), and weighting and addition (step 205).

The information representing the desired gradation curve K5, which has been obtained in the manner described above, may be stored in a storage means 27 (step 206). The desired gradation curve K5 may be taken as the fundamental gradation curve (step 207), and the processes in the enlargement and reduction means 2, the translation means 3, the rotation means 4, and the weighting and addition means 5 may be carried out on the desired gradation curve K5. In cases where the desired gradation curve K5 is again corrected in this manner, the correction may be carried out such that a point corresponding to a level, which is different from the point corresponding to the predetermined signal level having been set in the previous correction, represents a desired density and a desired contrast. Also, in cases where the processes in the enlargement and reduction means 2, the translation means 3, the rotation means 4, and the weighting and addition means 5 are repeated, a gradation curve can be obtained, which is extremely close to a desired ideal gradation curve.

In cases where an extreme correction of gradation is carried out, it will often occur that, as illustrated in FIG. 12, the output density value does not increase monotonously with respect to the input image signal value. In such cases, a process is carried out such that the desired gradation curve K5 after being corrected may increase monotonously. For example, as illustrated in FIG. 13, the output density value may be kept constant with respect to the section, in which the output density value does not increase monotonously, and a preceding section, and a gradation curve K6 may thereby be obtained. Alternatively, as illustrated in FIG. 14, the section, in which the output density value does not increase monotonously, and the preceding and subsequent sections may be converted into a straight line, and a gradation curve K7 may thereby be obtained. Any of other processes may be employed, with which the desired gradation curve K5 can be corrected so as to increase monotonously.

In the embodiment described above, the radiation image is stored on the stimulable phosphor sheet and is then read out from the stimulable phosphor sheet, and the image signal representing the radiation image is thereby obtained. Thereafter, the gradation curve to be used in the gradation processing of the image signal is corrected. The gradation correcting method and apparatus in accordance with the present invention are also applicable when an image signal is obtained by reading out an X-ray image from a sheet of film, on which the X-ray image has been recorded, and a gradation curve to be used in the gradation processing of the image signal is corrected. The gradation correcting method and apparatus in accordance with the present invention are further applicable when an image signal is obtained from a tomographic image recording operation, such as a CT scanning, or an electronic microscope image recording, and a gradation curve to be used in the gradation processing of the image signal is corrected. With the gradation correcting method and apparatus in accordance with the present invention, a desired gradation curve can be obtained regardless of the kind of the reproduced image.

What is claimed is:

1. A gradation correcting method for use in an image reproducing method, wherein a desired gradation curve is obtained by correcting a fundamental gradation curve, which serves as a reference gradation curve, and a visible image having desired gradation is reproduced from an image signal, which represents an image, in accordance with the desired gradation curve, the gradation correcting method comprising the steps of:
   i) setting a signal level-density coordinate system, in which the density of the visible image is plotted on one of orthogonal coordinate axes, and the level of the image signal is plotted on the other axis, and which is thus constituted of the density axis and the signal level axis,
   ii) enlarging or reducing the fundamental gradation curve along the density axis on said signal level-density coordinate system such that the minimum density and the maximum density, which are represented by the fundamental gradation curve, may be changed respectively to a desired minimum density and a desired maximum density, an enlarged or reduced fundamental gradation curve being thereby obtained,
   iii) translating said enlarged or reduced fundamental gradation curve in parallel with the density axis such that a point, which is located on said enlarged or reduced fundamental gradation curve and which corresponds to a predetermined density, may be shifted to a point representing a desired density, a translated fundamental gradation curve being thereby obtained,
   iv) rotating said translated fundamental gradation curve by a predetermined angle around said point, which is located on said translated fundamental gradation curve and which corresponds to said desired density, such that said point corresponding to said desired density may represent a desired contrast, a rotated fundamental gradation curve being thereby obtained, and
   v) weighting said enlarged or reduced fundamental gradation curve and said rotated fundamental gradation curve with predetermined weight factors, and adding said weighted gradation curves to each other such that the minimum density and the maximum density, which are represented by said rotated fundamental gradation curve, may be changed respectively to said desired minimum density and said desired maximum density, and such that said point corresponding to said desired density may represent said desired density and said desired contrast, whereby the desired gradation curve is obtained.

2. A gradation correcting method as defined in claim 1 wherein the predetermined weight factors are set such that the desired gradation curve may come into smooth contact with said rotated fundamental gradation curve at said point corresponding to said desired density.

3. A gradation correcting method as defined in claim 1 or 2 wherein the predetermined weight factors are set such that the desired gradation curve may come into smooth contact with said enlarged or reduced fundamental gradation curve at points, which correspond respectively to said desired minimum density and said desired maximum density.

4. A gradation correcting method as defined in claim 1 or 2 wherein a plurality of fundamental gradation curves are prepared, a single fundamental gradation curve is selected from the plurality of the fundamental gradation curves, and the single selected fundamental gradation curve is subjected to the enlargement or reduction, the translation, the rotation, and the weighting and addition.

5. A gradation correcting method as defined in claim 3 wherein a plurality of fundamental gradation curves are prepared, a single fundamental gradation curve is selected from the plurality of the fundamental gradation curves, and the single selected fundamental gradation curve is subjected to the enlargement or reduction, the translation, the rotation, and the weighting and addition.

6. A gradation correcting method as defined in claim 1 or 2 wherein the desired gradation curve is taken as the fundamental gradation curve, and the enlargement or reduction, the translation, the rotation, and the weighting and addition are repeated for said fundamental gradation curve.

7. A gradation correcting method as defined in claim 3 wherein the desired gradation curve is taken as the fundamental gradation curve, and the enlargement or reduction, the translation, the rotation, and the weighting and addition are repeated for said fundamental gradation curve.

8. A gradation correcting method as defined in claim 4 wherein the desired gradation curve is taken as the fundamental gradation curve, and the enlargement or reduction, the translation, the rotation, and the weighting and addition are repeated for said fundamental gradation curve.

9. A gradation correcting method as defined in claim 5 wherein the desired gradation curve is taken as the fundamental gradation curve, and the enlargement or reduction, the translation, the rotation, and the weighting and addition are repeated for said fundamental gradation curve.

10. A gradation correcting apparatus for use in an image reproducing apparatus, wherein a desired gradation curve is obtained by correcting a fundamental gradation curve, which serves as a reference gradation curve, and a visible image having desired gradation is reproduced from an image signal, which represents an image, in accordance with the desired gradation curve, the gradation correcting apparatus comprising:
   i) a fundamental gradation curve storage means for storing information representing the fundamental gradation curve, which serves as the reference gradation curve, on a signal level-density coordinate system, in which the density of the visible image is plotted on one of orthogonal coordinate axes, and the level of the image signal is plotted on the other axis, and which is thus constituted of the density axis and the signal level axis,
   ii) an enlargement and reduction means for enlarging or reducing the fundamental gradation curve along the density axis on said signal level-density coordinate system such that the minimum density and the maximum density, which are represented by the fundamental gradation curve stored in said fundamental gradation curve storage means, may be changed respectively to a desired minimum density and a desired maximum density, an enlarged or reduced fundamental gradation curve being thereby obtained, iii) a translation means for translating said enlarged or reduced fundamental gradation curve, which has been obtained from said enlargement and reduction means, in parallel with the density axis such that a point, which is located on said enlarged or reduced fundamental gradation curve and which corresponds to a predetermined density, may be shifted to a point representing a desired density, a translated fundamental gradation curve being thereby obtained, iv) a rotation means for rotating said translated fundamental gradation curve, which has been obtained from said translation means, by a predetermined angle around said point, which is located on said translated fundamental gradation curve and which corresponds to said desired density, such that said point corresponding to said desired density may represent a desired contrast, a rotated fundamental gradation curve being thereby obtained, and v) a weighting and addition means for weighting said enlarged or reduced fundamental gradation curve and said rotated fundamental gradation curve, which has been obtained from said rotation means, with predetermined weight factors, and adding said weighted gradation curves to each other such that the minimum density and the maximum density, which are represented by said rotated fundamental gradation curve, may be changed respectively to said desired minimum density and said desired maximum density, and such that said point corresponding to said desired density may represent said desired density and said desired contrast.

11. A gradation correcting apparatus as defined in claim 10 wherein said weighting and addition means sets the predetermined weight factors such that the desired gradation curve may come into smooth contact with said rotated fundamental gradation curve at said point corresponding to said desired density.

12. A gradation correcting apparatus as defined in claim 10 or 11 wherein said weighting and addition means sets the predetermined weight factors such that the desired gradation curve may come into smooth contact with said enlarged or reduced fundamental gradation curve at points, which correspond respectively to said desired minimum density and said desired maximum density.

13. A gradation correcting apparatus as defined in claim 10 or 11 wherein said fundamental gradation curve is one of a plurality of fundamental gradation curves and wherein said fundamental gradation curve storage means stores pieces of information representing said plurality of fundamental gradation curves.

14. A gradation correcting apparatus as defined in claim 12 wherein said fundamental gradation curve is one of a plurality of fundamental gradation curves and wherein said fundamental gradation curve storage means stores pieces of information representing said plurality of fundamental gradation curves.

15. A gradation correcting apparatus as defined in claim 10 or 11 further comprising:

a desired gradation curve storage means for storing the information representing the desired gradation curve, and a control means for feeding the information representing the desired gradation curve, which has been stored in said desired gradation curve storage means, into said enlargement and reduction means, and repeating the enlargement or reduction in said enlargement and reduction means, the translation in said translation means, the rotation in said rotation means, and the weighting and addition in said weighting and addition means with respect to the desired gradation curve.

16. A gradation correcting apparatus as defined in claim 12 further comprising:

a desired gradation curve storage means for storing the information representing the desired gradation curve, and a control means for feeding the information representing the desired gradation curve, which has been stored in said desired gradation curve storage means, into said enlargement and reduction means, and repeating the enlargement or reduction in said enlargement and reduction means, the translation in said translation means, the rotation in said rotation means, and the weighting and addition in said weighting and addition means with respect to the desired gradation curve.

17. A gradation correcting apparatus as defined in claim 13 further comprising:

a desired gradation curve storage means for storing the information representing the desired gradation curve, and a control means for feeding the information representing the desired gradation curve, which has been stored in said desired gradation curve storage means, into said enlargement and reduction means, and repeating the enlargement or reduction in said enlargement and reduction means, the translation in said translation means, the rotation in said rotation means, and the weighting and addition in said weighting and addition means with respect to the desired gradation curve.

18. A gradation correcting apparatus as defined in claim 14 further comprising:

a desired gradation curve storage means for storing the information representing the desired gradation curve, and a control means for feeding the information representing the desired gradation curve, which has been stored in said desired gradation curve storage means, into said enlargement and reduction means, and repeating the enlargement or reduction in said enlargement and reduction means, the translation in said translation means, the rotation in said rotation means, and the weighting and addition in said weighting and addition means with respect to the desired gradation curve.

19. The gradation correction method as defined in claim 1, wherein said predetermined weight factors are non-linear functions of the level of the image signal.

20. The gradation correction method as defined in claim 19, wherein said predetermined weight factors are calculated using a quartic polynomial.

21. The gradation correcting apparatus as defined in claim 10, wherein said predetermined weight factors are non-linear functions of the level of the image signal.

22. The gradation correcting apparatus as defined in claim 21, wherein said predetermined weight factors are calculated using a quartic polynomial.

* * * * *